(12) United States Patent
Antonini et al.

(10) Patent No.: US 10,500,423 B2
(45) Date of Patent: Dec. 10, 2019

(54) PASSENGER OXYGEN MASK AND BREATHING BAG FOR AN OXYGEN MASK

(71) Applicant: B/E Aerospace Systems GmbH, Lübeck (DE)

(72) Inventors: Marco Silvi Antonini, Krummesse (DE); Jan-Hinnerk Scheel, Wakendorf (DE)

(73) Assignee: B/E Aerospace Systems GmbH, Lubeck (DE)

(*) Notice: Subject to any disclaimer, the term of this patent is extended or adjusted under 35 U.S.C. 154(b) by 234 days.

(21) Appl. No.: 14/248,732

(22) Filed: Apr. 9, 2014

(65) Prior Publication Data

US 2015/0020809 A1 Jan. 22, 2015

(30) Foreign Application Priority Data

Apr. 9, 2013 (DE) .................. 10 2013 206 181

(51) Int. Cl.
A62B 18/08 (2006.01)
A62B 7/14 (2006.01)
(Continued)

(52) U.S. Cl.
CPC .............. *A62B 7/14* (2013.01); *A62B 7/12* (2013.01); *A62B 9/006* (2013.01); *A62B 9/04* (2013.01);
(Continued)

(58) Field of Classification Search
CPC .... A61B 9/00; A61B 9/02–027; A61M 16/00; A61M 16/06–0694; A61M 16/20–209; A61M 2016/0003–0042; A62B 7/00; A62B 7/04; A62B 7/14; A62B 18/00; A62B 18/10; B63C 11/12; B63C 11/18
See application file for complete search history.

(56) References Cited

U.S. PATENT DOCUMENTS 3,045,672 A * 7/1962 Croasdaile ........... A62B 18/025
128/205.17
3,097,642 A * 7/1963 Russell ................. A61M 16/06
128/205.17
(Continued)

FOREIGN PATENT DOCUMENTS

DE 69424994 10/2000
DE 10258917 7/2004
(Continued)

OTHER PUBLICATIONS

Office Action on Chinese Patent Application No. 201410139101.7 dated Nov. 16, 2017. 21 pages.
(Continued)

*Primary Examiner* — Tan-Uyen T Ho
*Assistant Examiner* — Ned T Heffner
(74) *Attorney, Agent, or Firm* — Donna P. Suchy

(57) ABSTRACT

The invention relates to a passenger oxygen mask for the emergency supply of oxygen in an aircraft, with a breathing bag which is provided on the entry side with a tube for the oxygen supply, wherein the tube and the breathing bag consist of polyurethane. The invention further relates to a breathing bag, with which a flow indicator is integrated into the connection piece.

6 Claims, 2 Drawing Sheets

(51) Int. Cl.
  *B64D 10/00* (2006.01)
  *A62B 7/12* (2006.01)
  *A62B 9/00* (2006.01)
  *A62B 9/04* (2006.01)
  *A62B 18/00* (2006.01)
  *A62B 18/02* (2006.01)
(52) U.S. Cl.
  CPC ............ *A62B 18/006* (2013.01); *A62B 18/02* (2013.01); *A62B 18/08* (2013.01); *B64D 10/00* (2013.01); *B64D 2231/025* (2013.01)

(56) References Cited

U.S. PATENT DOCUMENTS

| | | | | |
|---|---|---|---|---|
| 4,685,456 A | * | 8/1987 | Smart | A61M 16/08 128/204.18 |
| 5,265,597 A | * | 11/1993 | Wallis | A62B 18/025 128/205.17 |
| 5,343,859 A | * | 9/1994 | Kikut | A62B 7/14 128/205.13 |
| 6,352,077 B1 | * | 3/2002 | Shah | A61M 16/0078 128/205.13 |
| 7,159,533 B1 | * | 1/2007 | Redd | A61M 16/08 116/112 |
| 9,027,557 B2 | | 5/2015 | Dussart et al. | |
| 2007/0240720 A1 | * | 10/2007 | Castro | A62B 18/00 128/206.12 |

FOREIGN PATENT DOCUMENTS

DE 20 2005 003 559  7/2005
EP 2446930 A1  2/2012

OTHER PUBLICATIONS

Examination Report for German Application No. 102013206181.1, dated Nov. 29, 2013, 4 pages.

* cited by examiner

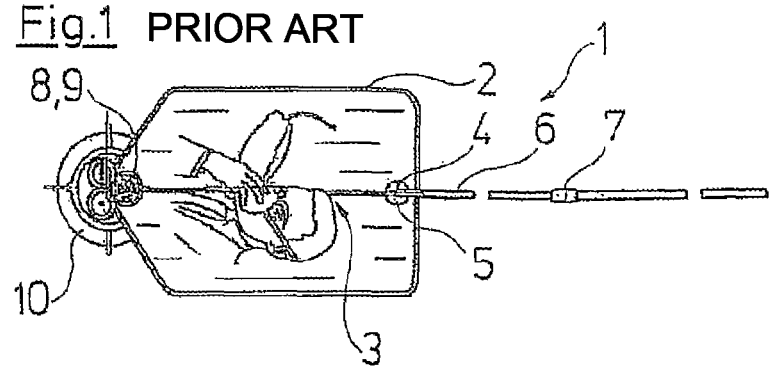
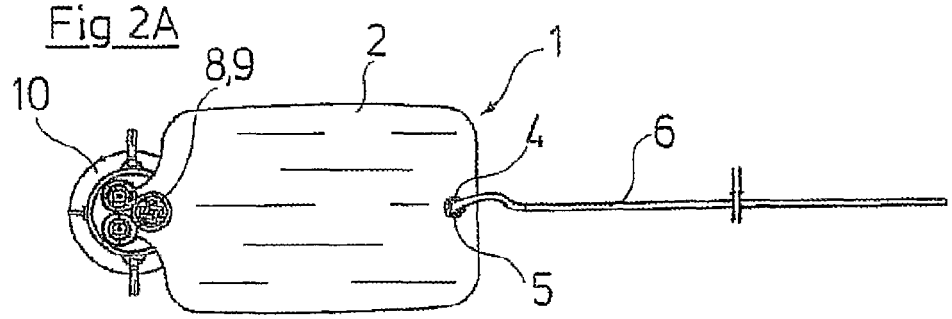
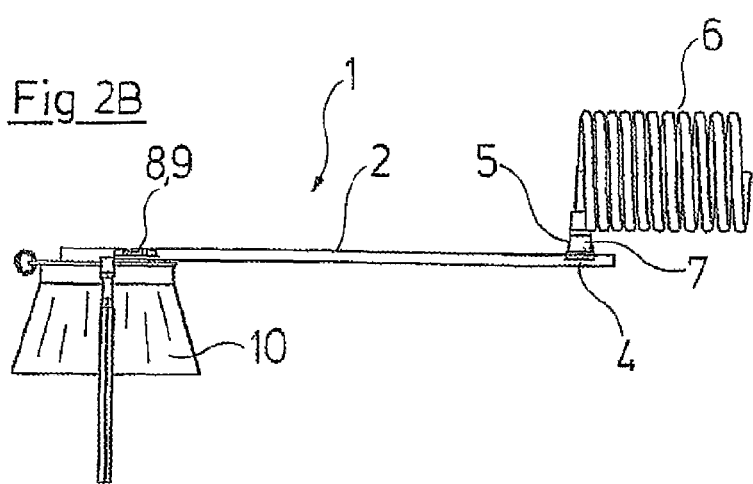

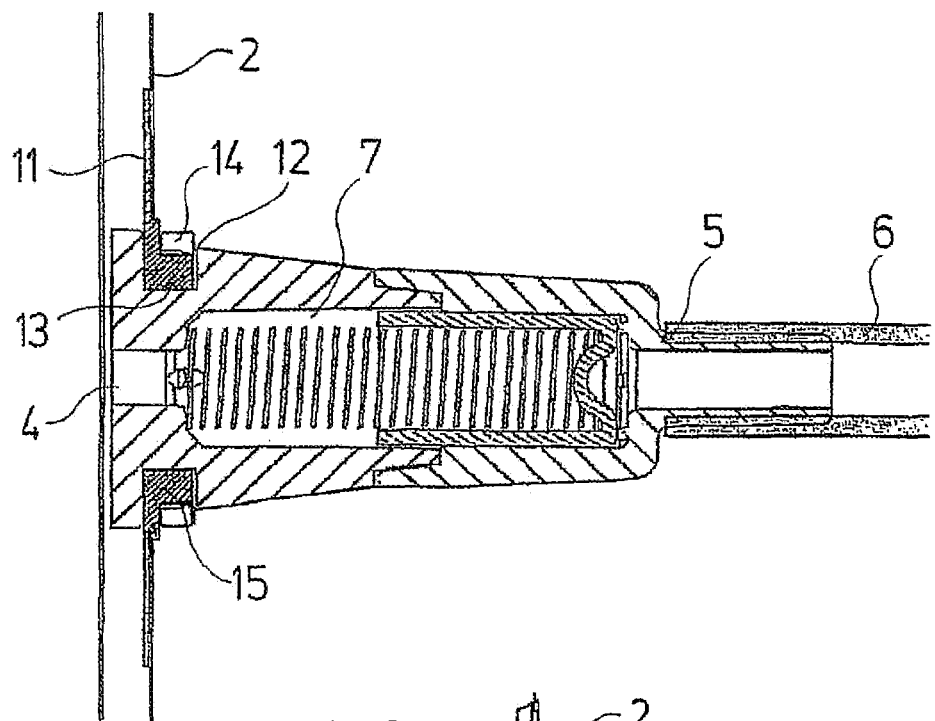
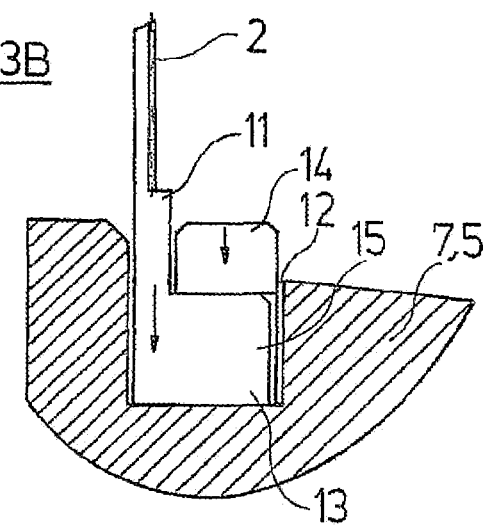

PASSENGER OXYGEN MASK AND BREATHING BAG FOR AN OXYGEN MASK

CROSS-REFERENCES TO RELATED APPLICATIONS

This application claims priority from German Patent Application No. 10 2013 206 181.1, filed Apr. 9, 2013 incorporated by reference in its entirety.

BACKGROUND

The invention relates to a passenger oxygen mask and to a breathing bag for an oxygen mask.

Aircrafts are equipped with oxygen masks which are arranged above each seat in the cabin ceiling, in order to cover the oxygen requirement of passengers and crew members of the aircraft given the occurrence of a sudden pressure drop in an aircraft. The oxygen masks known from the state of the art are constructed as follows:

A breathing bag is provided with an oxygen inlet, on which a sealing disk with a so-called fitting or connection piece for receiving a flexible tube is provided, said sealing disk usually being welded to the breathing bag. The tube is stuck onto and bonded on the fitting of the breathing bag. Alternatively, oxygen masks are known, with which the tube connection is effected by way of enveloping the end of the tube by way of the breathing bag, and bonding the end of the tube to a piece of "tube sleeve". An outlet, on which a sealing disk is welded to the breathing bag, is located at the side of the breathing bag which is opposite to the inlet, whereby this sealing disk is fastened with a connection element on the mask. The connection element is located in the breathing bag and for the connection of the breathing bag to the mask body presses the sealing disk of the breathing bag onto a provided sealing edge of the mask. The sealing disk of the breathing bag presses onto the sealing edge of the mask by way of a snap-in function and the axial introduction of force, so that both elements are connected and sealed.

The breathing bag as well as the tube hereby is manufactured of a polyvinylchloride (PVC) material.

With such oxygen masks, it is however necessary to connect the connection element and the tube fitting on the breathing bag to a pull-relief lanyard which runs and is tied in the breathing bag, in order to be able to accommodate tensile forces according to the international regulations (AS8025).

Moreover, with configurations known from the state of the art, the course of the tube is interrupted by a flow indicator which is stuck into the respective tube ends. The sticking of both tube ends onto the flow indicator is additionally secured with an adhesive. The problem with this on the one hand is hereby the assembly, since one must take care of the indicated flow direction of the flow indicator, and on the other hand, the number of interfaces of the tube is increased due to the introduction of the flow indicator into the tube which is then interrupted in this region.

It is therefore the object of the invention, to overcome the problems with the oxygen masks which are known from the state of the art and which are listed above.

SUMMARY OF THE INVENTION

According to the invention, this object achieved by a passenger oxygen mask with the features specified in claim 1 as well as by a breathing bag for an oxygen mask with the features specified in claim 11. Advantageous designs of the invention are specified in the respective dependent claims, the subsequent description and the drawing. Hereby, according to the invention, the features specified in the dependent claims and the description can form the solution according to the invention and according to claim 1 as well as according to claim 11, in each case on their own, but also in a suitable combination.

According to the invention, a passenger oxygen mask for the emergency supply of oxygen in an aircraft is provided, with a breathing bag which on the entry side is provided with a tube for the oxygen supply, wherein the tube and the breathing bag consist of polyurethane. On account of the material properties of polyurethane, due to the use of polyurethane (PU) as a material for the tube as well as the breathing bag instead of polyvinyl chloride (PVC), one can make do without the otherwise necessary pull-relief lanyard. This significantly simplifies the manufacture and assembly of the breathing bag or of the complete oxygen mask. Moreover, one can make do without the further securing of the tube on the breathing mask, for example by way of bonding, on account of the material characteristics of the polyurethane.

According to a preferred embodiment, a flow indicator is provided between the tube and the breathing bag and is connected directly to the breathing bag. Further interfaces, for example in the tube itself are avoided by way of this, or the interfaces are minimised in a simple manner. One can now use only a single-part tube instead of the tube divided in two, wherein then only a single connection point exists on the part of the mask, instead of the three tube connection points. The manufacture and assembly of the oxygen mask is further simplified by way of this.

Preferably, the flow indicator is formed as a connection piece for the tube, at the entry side. As further mentioned, such a configuration reduces the interfaces of the tube.

Moreover, it is advantageous if the tube for supplying oxygen to the breathing bag is designed as one piece.

The tube can also be designed as a spiral tube. The packing of the tube into the mask body can be simplified by way of a spiralisation of the tube. Moreover, a coordinated ejection out of the oxygen box is made possible by way of this.

Preferably, the tube is stuck onto the connection piece.

A further advantage results if the tube is bonded to the connection piece, since a material-fit, intimate and tensionally strong bond or interconnection is ensured by way of this.

According to a further preferred embodiment, a seal is arranged between the flow indicator and breathing bag. The seal can advantageously be designed as a sealing disk which is welded to the breathing bag.

Moreover, according to a yet further preferred embodiment, a clamping ring can be arranged on the seal and exerts a radial clamping force onto the seal, so that a permanent and reliable sealing can be achieved.

According to the invention, a breathing bag for an oxygen mask is provided, which comprises an inlet, on which a seal with a connection piece for receiving the tube is provided, wherein the breathing bag is manufactured from polyurethane. The breathing bag according to the invention has the advantages with regard to tensile strength and simplification of the manufacture and assembly, which have already been described above.

According to a further preferred embodiment, a flow indicator is integrated into the connection piece.

BRIEF DESCRIPTION OF THE DRAWINGS

The invention is hereinafter explained by way of one embodiment example represented in the drawing. There are shown in:

FIG. 1 is a plan view of an oxygen mask according to the state of the art,

FIG. 2A is a plan view of an oxygen mask according to one embodiment of the invention, FIG. 2B is a view of the oxygen mask according to FIG. 2A, which is rotated by 90° with respect to FIG. 2A, and FIG. 3A and FIG. 3B are respective detail views of a connection piece of the oxygen mask shown in FIGS. 2A and 2B.

DETAILED DESCRIPTION OF THE PREFERRED EMBODIMENTS

FIG. 1 is an oxygen mask 1 which can be applied for passengers of an aircraft, according to the state of the art. The oxygen mask 1 comprises a breathing bag 2 which is manufactured of PVC and in which a pull-relief lanyard 3 for reinforcement purposes is arranged. An oxygen inlet 4 is provided on the breathing mask 2, on which inlet a sealing disk (not shown) welded to the breathing bag 2 and having a connection piece 5 for receiving a tube 6 is arranged. The tube 6 is also manufactured of PVC. A flow indicator 7 is introduced in the tube 7 and interrupts the course of the tube, by which means two further connection points or interfaces of the tube 6 arise. An outlet 8, on which a sealing disk (not represented) is likewise welded to the breathing bag 2 is located on the side of the breathing bag 2 which lies opposite the inlet 4, and this sealing disk is fastened with the connection element 9 on the mask. The connection element 9 is located in the breathing bag 2, and on connection of the breathing bag 2 to the mask body, pushes the sealing disk of the breathing bag 2 onto an envisaged sealing edge of the mask.

FIGS. 2A and 2B are respective views of an oxygen mask 1 according to one embodiment of the invention, which can be applied for passengers in an aircraft, wherein FIG. 2A is a plan view of the oxygen mask 1 and FIG. 2B a lateral view of the oxygen mask 1. As also the case with the oxygen mask 1 represented in FIG. 1, the oxygen mask 1 shown here likewise comprises a breathing bag 2 with an oxygen inlet 4 and an outlet 8. The tube 6 is connected to the oxygen inlet 4 via a connection piece 5. A mask 10 is connected to the outlet via the connection element 9. In contrast to the oxygen mask 1 represented in FIG. 1, here however the breathing bag 2 and the tube 6 are manufactured of polyurethane, so that one can make do without the provision of a pull-relief lanyard 3. Furthermore, it can be recognised particularly well in FIG. 2B, that the tube 6 is designed as a spiral tube which entails the already mentioned advantages with regard to the handling of the tube 6 on packing this into the mask 10 and on ejection of the mask 10. A flow indicator 7 is integrated into the connection piece 5, so that the tube 6 is designed in a single-part manner without interruption and additional interfaces.

FIG. 3A and FIG. 3B are respective detail views of a connection piece 5 of the oxygen mask 1 shown in FIG. 2A and FIG. 2B, wherein FIG. 3A is a sectioned view through the connection piece 5 and FIG. 3B is an enlarged sectioned view of a detail in the sealing region of the connection piece 5. As can be recognised in FIG. 3B, a sealing disk 11 is provided between the breathing bag 2 and the connection piece 5. The sealing disk 11 is welded to the breathing bag 2. A peripheral, groove-like recess 12 is provided in the connection piece 5, in which recess the sealing disk 11 is received. Moreover, a clamping ring 14 is arranged on a projection 15 of the sealing disk 11, in order to press the sealing disk 11 on a sealing edge 13 into the recess 12 in a fixed manner or to fix it therein. The clamping ring 14 exerts a radial clamping force on the sealing disk 11, characterised in FIG. 3B by the arrow and the letter F. The flow indicator 7 on the entry side is designed as a connection piece 5, onto which the tube 6 is stuck, as is recognisable in FIG. 3A, which permits a simplified assembly of the oxygen mask 1 and minimises the interfaces of the tube 6.

LIST OF REFERENCE NUMERALS

1—oxygen mask
2—breathing bag
3—pull-relief lanyard
4—oxygen inlet
5—connection piece
6—tube
7—flow indicator
8—outlet
9—connection element
10—mask
11—sealing disk
12—recess
13—sealing edge
14—clamping ring

The invention claimed is:

1. An aircraft passenger oxygen mask, comprising:
a polyurethane breathing bag having an oxygen inlet and an oxygen outlet;
a polyurethane spiral oxygen feed tube;
a mask; and
a hollow, frusto-conical connection piece attached to an exterior surface of the polyurethane breathing bag at the oxygen inlet and coupling the polyurethane spiral oxygen feed tube to an interior of the polyurethane breathing bag, the hollow, frusto-conical connection piece includes a channel having a flow indicator therein extending substantially from the polyurethane spiral oxygen feed tube to the polyurethane breathing bag and disposed external to the polyurethane breathing bag, an annular peripheral groove into which a sealing disk resides, the annular peripheral groove extending radially inward from a portion of the frusto-conical connection piece having an outer wall radius greater than an inner tube radius of the polyurethane spiral oxygen feed tube, the flow indicator extending through the portion of the frusto-conical connection piece, the frusto-conical connection piece spaces the polyurethane spiral oxygen feed tube from the portion of the frusto-conical connection piece and the polyurethane breathing bag, the sealing disk having an inner radius, a first circumferential shoulder disposed substantially within an outer surface of the frusto-conical connection piece for receiving an annular locking ring, the first circumferential shoulder defining an outer shoulder radius less than the outer wall radius of the portion of the frusto-conical connection piece, and a radially projecting surface for receiving a sealed surface of the breathing bag.

2. The aircraft passenger oxygen mask of claim 1, wherein the polyurethane breathing bag is welded to the sealing disk.

3. The aircraft passenger oxygen mask of claim 1, wherein the mask is connected to the polyurethane breathing bag via a connector.

4. The aircraft passenger oxygen mask of claim 1, wherein the polyurethane spiral oxygen feed tube is bonded to the frusto-conical connection piece.

5. The aircraft passenger oxygen mask of claim 1, comprising:
   the annular locking ring arranged on the first circumferential shoulder of the sealing disk and radially outward from the first circumferential shoulder of the sealing disk to press the sealing disk radially inward into the annular peripheral groove, the sealing disk spaces the annular locking ring from the polyurethane breathing bag.

6. The aircraft passenger oxygen mask of claim 1, comprising:
   the oxygen inlet defines an opening having an opening radius greater than the outer wall radius of the portion of the frusto-conical connection piece.

* * * * *